(12) United States Patent
Boksbeld

(10) Patent No.: US 11,878,739 B2
(45) Date of Patent: Jan. 23, 2024

(54) MOTOR VEHICLE BODY PANEL

(71) Applicant: COMPAGNIE PLASTIC OMNIUM SE, Lyons (FR)

(72) Inventor: Marcel Boksbeld, Sainte-Julie (FR)

(73) Assignee: COMPAGNIE PLASTIC OMNIUM SE, Lyons (FR)

( * ) Notice: Subject to any disclaimer, the term of this patent is extended or adjusted under 35 U.S.C. 154(b) by 0 days.

(21) Appl. No.: 17/663,969

(22) Filed: May 18, 2022

(65) Prior Publication Data

US 2022/0371665 A1    Nov. 24, 2022

(30) Foreign Application Priority Data

May 19, 2021  (FR) ...................................... 2105216

(51) Int. Cl.
| | |
|---|---|
| *B62D 27/04* | (2006.01) |
| *B62D 29/04* | (2006.01) |
| *B62D 25/06* | (2006.01) |
| *B62D 27/02* | (2006.01) |

(52) U.S. Cl.
CPC ............ *B62D 29/048* (2013.01); *B62D 25/06* (2013.01); *B62D 27/026* (2013.01); *C09J 2301/208* (2020.08)

(58) Field of Classification Search
CPC ........ B62D 25/06; B62D 25/02; B62D 25/10; B62D 25/105; B62D 27/026; B62D 29/04; B62D 29/048; B62D 29/005; C09J 2301/208
USPC .......................... 296/210, 29, 191, 201, 96.21
See application file for complete search history.

(56) References Cited

U.S. PATENT DOCUMENTS

| | | | | |
|---|---|---|---|---|
| 4,681,794 A | * | 7/1987 | Kunert ................... | B60J 10/244 52/204.597 |
| 6,092,953 A | | 7/2000 | Chaptal et al. | |
| 2003/0168889 A1 | * | 9/2003 | Comert ............... | B62D 27/026 296/210 |
| 2011/0300361 A1 | * | 12/2011 | Nakayama ................ | C09J 7/29 428/220 |
| 2012/0133179 A1 | * | 5/2012 | Baroggi ................... | B60J 10/50 296/201 |

FOREIGN PATENT DOCUMENTS

| | | | | |
|---|---|---|---|---|
| DE | 10158961 A1 | 6/2003 | | |
| DE | 102019003247 A1 | 11/2019 | | |
| EP | 0860615 A1 | 8/1998 | | |
| FR | 2877881 A1 | 5/2006 | | |
| JP | 62194980 A | * 8/1987 | ............ | B62D 25/06 |
| JP | 09132165 A | * 5/1997 | | |
| WO | 0187691 A1 | 11/2001 | | |

OTHER PUBLICATIONS

Translation of JP62-194980 (Year: 1987).*

* cited by examiner

*Primary Examiner* — Dennis H Pedder
(74) *Attorney, Agent, or Firm* — M&B IP Analysts, LLC

(57) ABSTRACT

The present disclosure relates to a motor vehicle body panel including a main body made of plastic material and sized to be bonded to a motor vehicle structure, and a bead of glue arranged to receive a second bead of glue, the bead of glue being made of a more flexible material than that forming the main body.

10 Claims, 5 Drawing Sheets

[Fig. 1]
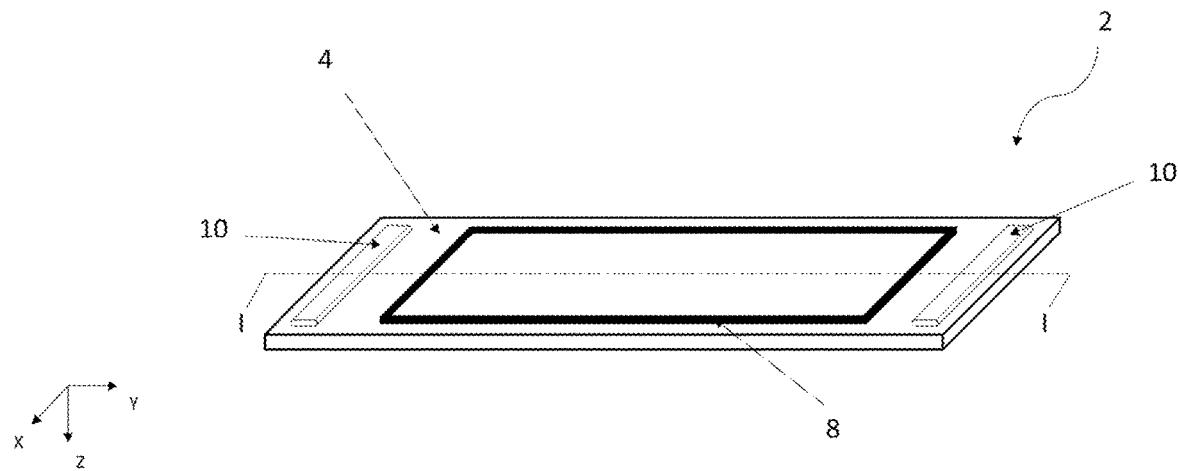
[Fig. 2]
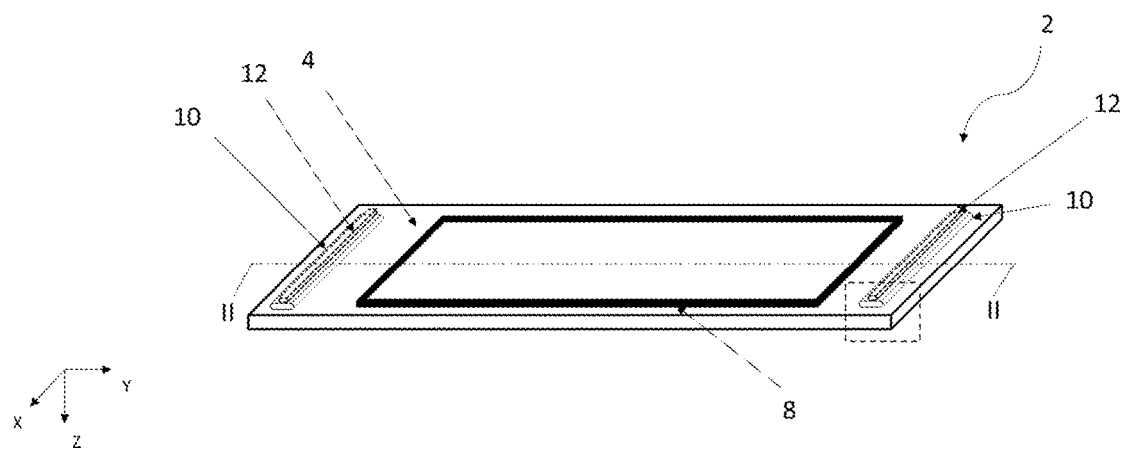

[Fig. 3]
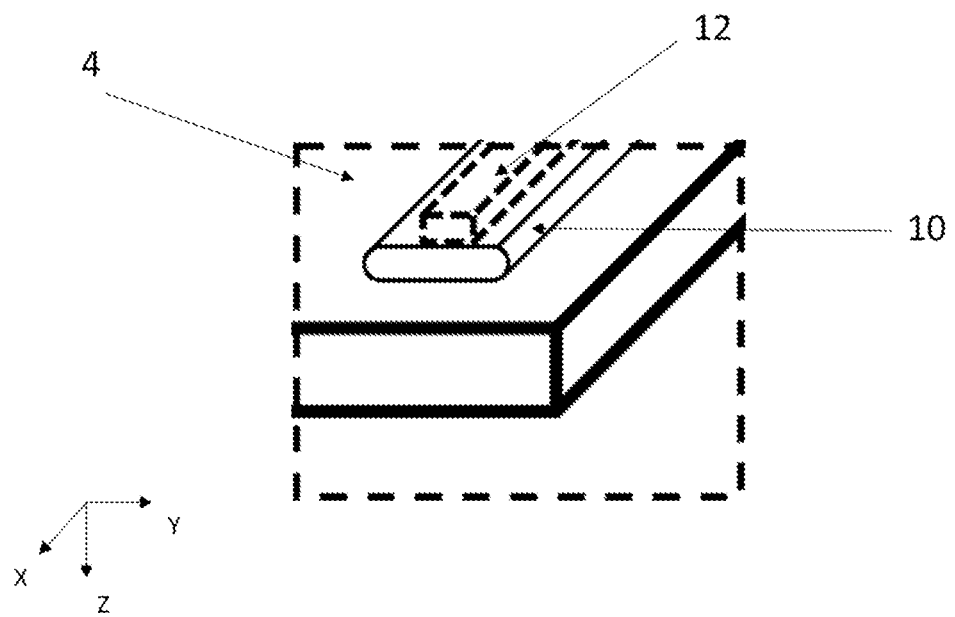
[Fig. 4]
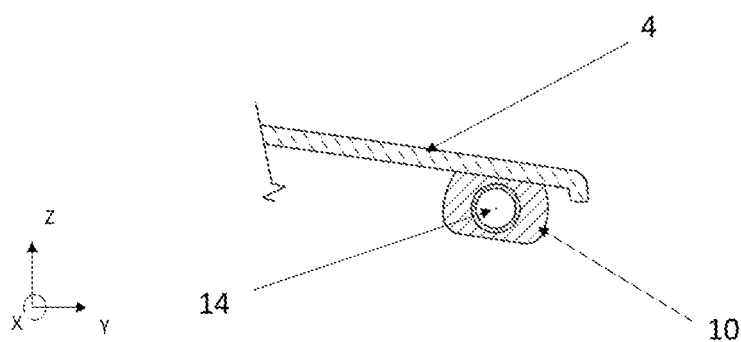

[Fig. 5]
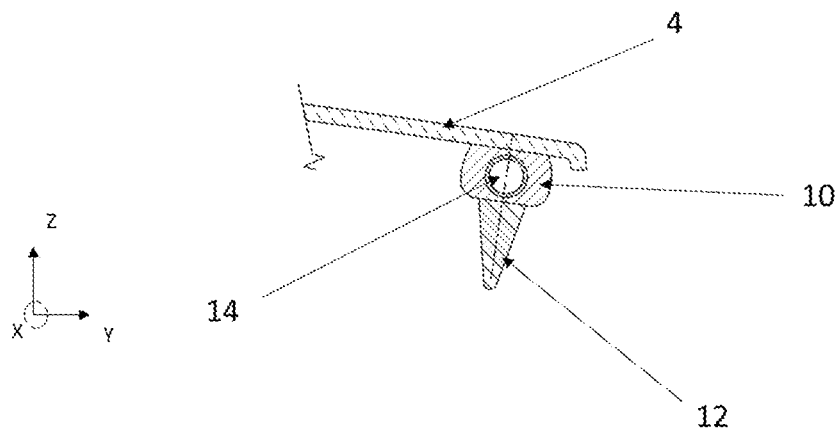
[Fig. 6]
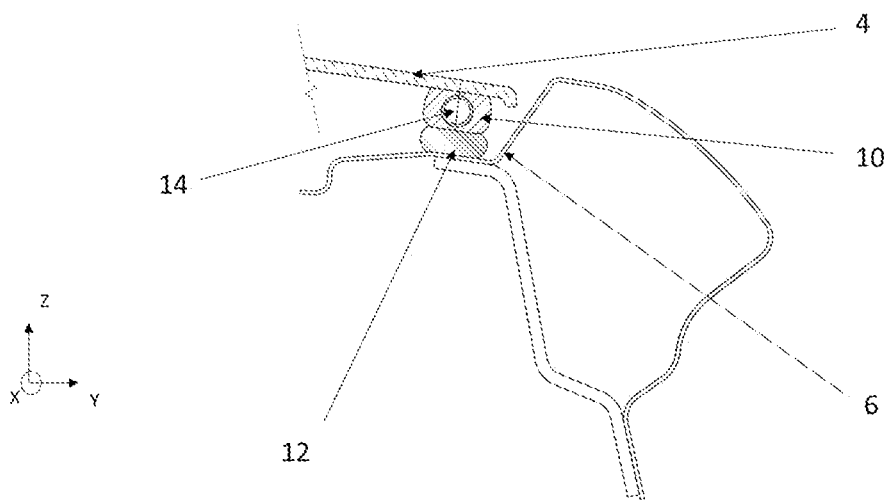

[Fig. 7]
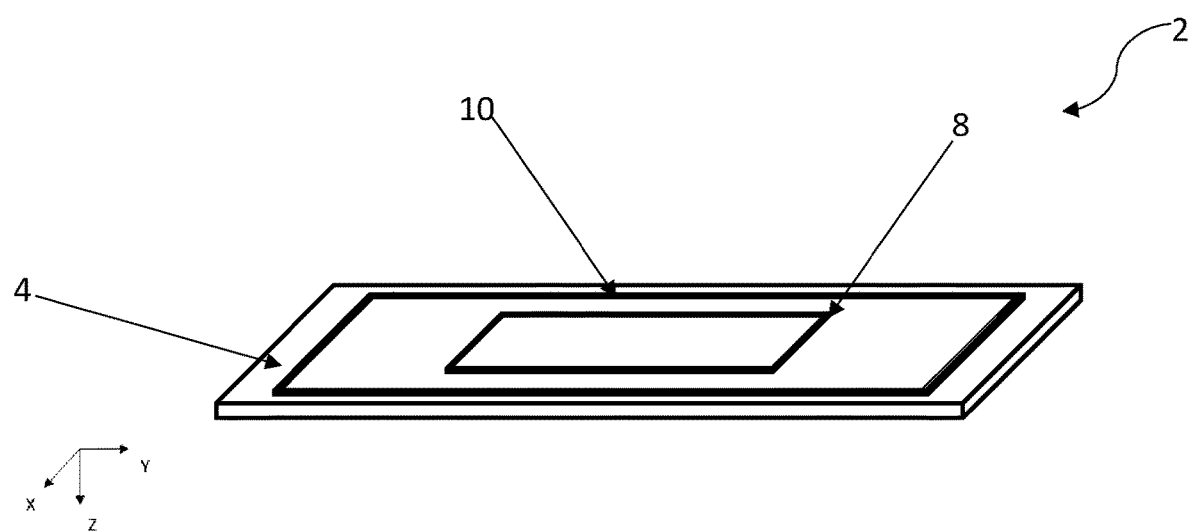

[Fig. 8]
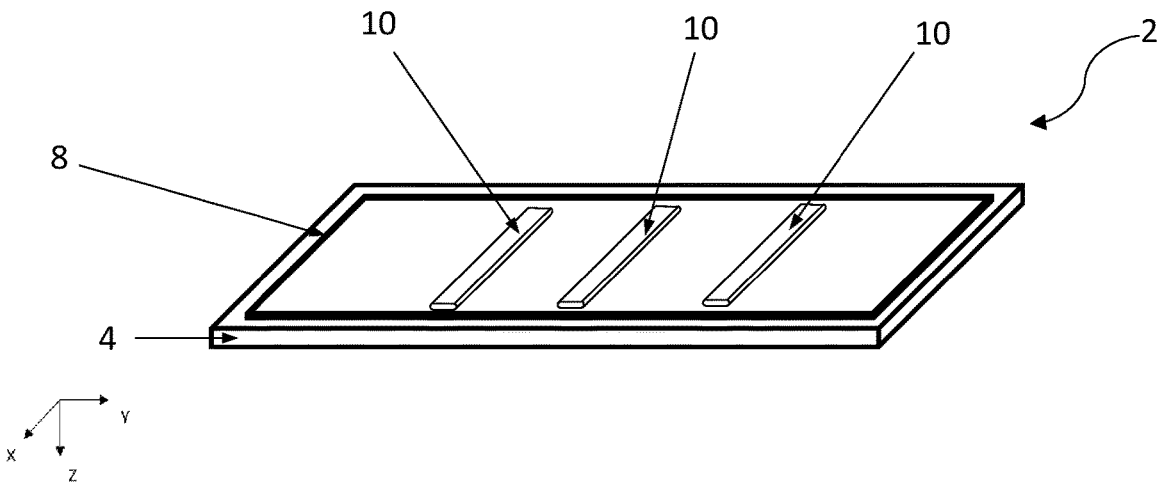
[Fig. 9]
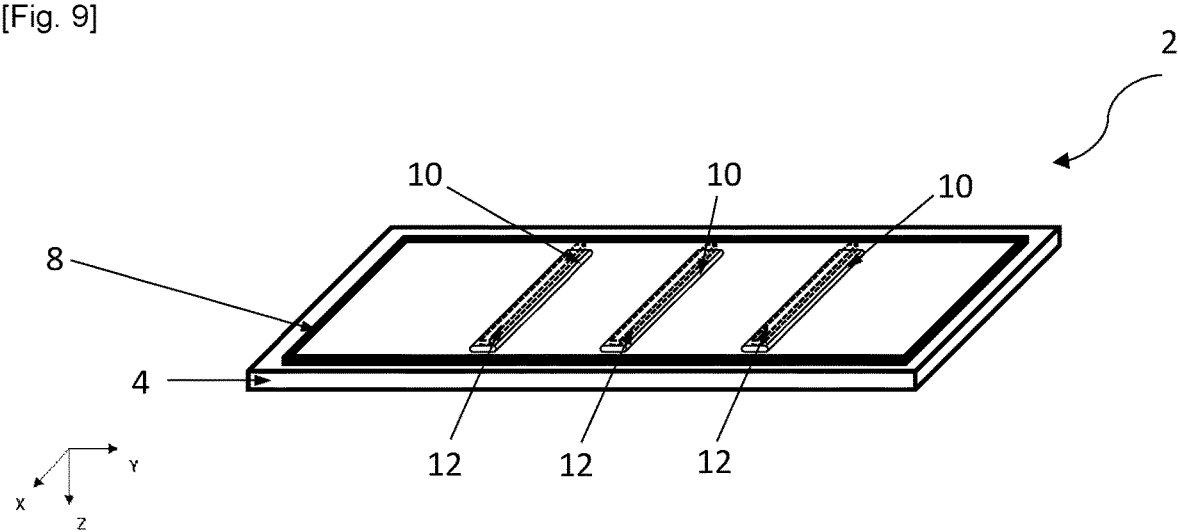

MOTOR VEHICLE BODY PANEL

The present disclosure relates to motor vehicle body panels intended to be attached to a motor vehicle body in white.

Some body panels, for example a roof panel, are intended to be attached to the body in white of a vehicle. Some of these panels can be made of sheet metal or aluminum and attached to the body in white of the steel vehicle. Indeed, it is simpler and more economical to make the panel from the same material as the body in white, both from the point of view of the design and that of the attachment between the two elements.

However, it is possible that, for certain reasons, such as a need for transparency to the waves emitted by a wave emitter, for example AM, FM, DAB or radar-type communication (i.e. the ability of a material passed through by an incident wave flux to transmit a fraction greater than 90% of the wave flux passing through it), constraints may apply to the choice of materials used to produce the body panel. For example, it is not possible to produce a sheet metal or aluminum body panel when it is intended to be passed through by waves emitted and/or received by antennas present on the motor vehicle.

Therefore, it may be necessary to make a plastic body panel, the latter being attached to the body in white of a motor vehicle.

However, this change of materials can lead, for example if the body panel is made of plastic, to obtaining a body in white/body panel assembly in which each of the two elements is made from a material having a very different coefficient of linear thermal expansion (or CLTE) from one another. For example, a so-called "low CLTE" plastic material has a coefficient of linear thermal expansion that is three to four times greater than that of steel. "Coefficient of linear thermal expansion" refers to a parameter describing the change in length, or dilation, of a material as a function of the temperature of said material.

Indeed, this coefficient is much higher for the plastic material than for the metals usually used for the body structure of the vehicle, which results in a much greater expansion of the plastic material than of the steel or aluminum. In the event of a rise in temperature, in particular in the event of exposure to sunlight, these differences in thermomechanical behavior cause differential expansion between the panels causing significant tensions within the bead of glue (or even a loss of adhesion of the glue). The deformation of the bead of glue may then be insufficient to absorb these differential expansions. This can lead to deformations of the body panel, in particular in the longitudinal and transverse directions of the motor vehicle (X and Y directions, respectively, according to the conventional motor vehicle directions) when the panel is a roof panel, which panel is very exposed to sunshine. This can lead to aesthetic defects in the body of the vehicle (deformation of the body panel, for example). It is therefore important to avoid warping of the body panel and also to manage the play and flush between the edges of the body panel and the body structure of the vehicle, these deformations being generated by the differential expansion. For example, it would not be acceptable for the part with the highest coefficient of linear thermal expansion to leave its elastic deformation range and therefore undergo permanent deformations, even after the part has cooled.

To overcome this, it is possible to attach the body panel on the body in white of the vehicle using fasteners allowing at least one degree of freedom of the body panel with respect to the body in white of the motor vehicle, also called floating links. This may for example involve attachment by screwing in oblong holes. Mention may be made, for example, of document EP 0 860 615 B1 illustrating an example of such an attachment.

However, this type of attachment is expensive and complex to implement. In addition, they can lead to leaks in the assembly formed by the body panel and the body in white at the various attachment points.

The object of the present disclosure is in particular to provide a plastic body panel that can be attached in a simple manner to the body in white of a vehicle while avoiding the appearance of aesthetic defects as described above.

To this end, the subject of the present disclosure is a motor vehicle body panel comprising:
- a main body made of plastic material and sized to be bonded to a motor vehicle body structure, and
- at least one bead of glue arranged to receive a second bead of glue, the bead of glue being made of a more flexible material than that forming the main body.

Thus, a body panel is obtained including a bead of glue intended to serve as a support for a second bead of glue. In addition, this bead of glue is made of a more flexible material than the body panel.

Consequently, this bead of glue has the ability to deform during thermal expansion of the body panel (and therefore during the application of a shearing stress on the bead of glue) in order to prevent the latter from warping as is the case with an attachment that does not allow relative movement of the body panel with respect to a body structure, for example the body in white of the vehicle.

In addition, the bead of glue forms a "wedge" on which a second bead of glue can be deposited, which allows the body panel to be attached to the body structure by seeking a deeper support point or allows compensation for a local variation in spacing between the body panel and the body structure. This allows optimized positioning of the body panel with respect to the body structure at the space separating the latter (for example in a vertical direction, or direction Z of the vehicle, when it is a roof panel).

According to other optional features of the body panel, taken alone or in combination:
- the bead of glue comprises a core configured to soften the first bead of glue. This allows the flexibility of the latter to be amplified during expansion of the body panel;
- the core comprises a more flexible material than that forming the rest bead of glue. A core that is more flexible than the rest of the bead of glue will allow the latter to be able to deform even more;
- the core comprises a more rigid material than that forming the rest bead of glue. A core that is more rigid than the rest of the bead of glue will allow doubling of the most flexible material (i.e. the rest of the bead of glue), which will be present on either side of this more rigid core, thereby increasing its expansion tolerance. In addition, the core that is more rigid than the rest of the bead of glue contributes to creating the wedge mentioned above;
- the core is a hollow core. A hollow core will allow the latter to be able to deform even more;
- the bead of glue has a thickness greater than or equal to 5 millimeters, preferably between 5 millimeters and 20 millimeters. These thickness values guarantee optimum flexibility of the bonding track and contribute to forming the wedge mentioned above;
- the bead of glue is placed on the periphery of the main body. It is therefore placed as close as possible to the area where the difference in expansion between the body panel and the body structure is significant;

the bead of glue forms a closed loop. It therefore allows sealing of the area of the body panel located inside the closed loop;

the body panel may comprise several beads of glue, at least one of which is positioned more in the center of the body panel than the other bead(s) of glue, for example in the center of the body panel. This makes it possible, in addition to supporting the expansion of the body panel, to prevent the latter from bulging with respect to the vehicle structure in the more central part;

the bead of glue is a bead of polyurethane-based glue. This is an ideal base for such an application;

the body panel being a motor vehicle roof panel.

The present disclosure also has a method of manufacturing a body panel according to the embodiment, the method comprising the following characteristics:

molding the main body, applying a bead of glue on one side of the main body.

Preferably, the bead of glue is deposited with a robot by a nozzle on the surface of the main body.

The bead of glue can also harden before depositing a second bead of glue.

BRIEF DESCRIPTION OF THE FIGURES

The various embodiments will be better understood on reading the description which follows, given solely by way of example and with reference to the appended drawings in which:

FIG. 1 is a perspective view of a body panel according to an embodiment,

FIG. 2 is a perspective view of a body panel according to embodiment on which a second bonding track is deposited, FIG. 3 is a close-up view of the framed portion in FIG. 2;

FIG. 4 is a sectional view along section plane II of the body panel according to FIG. 1;

FIG. 5 is a sectional view along section plane II-II of the body panel according to FIG. 2;

FIG. 6 is a sectional view of part of a body panel according to the embodiment mounted on a body in white of a motor vehicle;

FIG. 7 is a perspective view of a body panel according to one embodiment;

FIG. 8 is a perspective view of a body panel according to another embodiment; and FIG. 9 is a perspective view of body panel according to the another embodiment on which a second bonding track is deposited.

In the following description, the directions mentioned such as the longitudinal direction X, the transverse direction Y or even the vertical direction Z refer to the directions used for a motor vehicle.

The figures illustrate an example of a body panel, which is a roof panel. Of course, and apart from the examples specific to a roof panel, the content of the description applies to any body panel sized to be bonded to a motor vehicle body in white.

DETAILED DESCRIPTION

Reference is now made to FIG. 1 illustrating a body panel 2. It comprises a main body 4 made of plastic material, preferably of thermoplastic material. Such a main body 4 is for example made by injection molding. It could also be made by thermoforming.

The main body 4 is sized to be bonded to a motor vehicle body structure 6 (as shown in FIG. 5), such as the body in white. For example, and if it is a roof panel, the main body 4 being sized to be bonded in a recess in the upper face of the body structure 6 while leaving a clearance between the edge of the main body 4 and that of the recess of the body structure 6. It is also possible to dimension the body panel 2 so that it is attached to another vehicle part, for example a structural body element made from a material having a coefficient of linear thermal expansion lower than that of the body panel 2, such as a side door frame or hood structure (anything that then applies to a body in white could apply to a larger body panel).

It is possible for the main body 4 made from plastic material to be used to cover a cavity made in the body structure 6, the body structure 6 being intended to receive a device for emitting and/or receiving waves such as a radar, a lidar, an antenna device or even a camera. This allows protection for these devices without, however, impeding the passage of the waves emitted and/or received by them. For this purpose, the body panel 2 can comprise, on the face of the main body 4 intended to face the body structure 6, a seal 8 making it possible to prevent the entry of water into said cavity. A seal can of course be useful even in the absence of a cavity in order to prevent the infiltration of water between the body panel 2 and the body structure 6.

In order to be able to allow a relative deformation of the body panel 2 with respect to the body structure 6, which is conventionally made of sheet metal or aluminum, the latter comprises a bead of glue 10 arranged to receive a second bead of glue 12 (illustrated in FIG. 2), the bead of glue 10 being made of a more flexible material than that forming the main body 4.

Since this bead of glue 10 is made from a more flexible material than that of the main body 4, it can deform during thermal expansion of the latter and thus prevent warping of the body panel 4. In addition, the bead of glue 10 is intended to receive a second bead of glue 12, which can for example be made of polyurethane just like the first bead of glue 10, or of any other material having chemical compatibility in surface adhesion with polyurethane. Stacking the two beads of glue makes it possible to accompany the expansion of the body panel 4 by increasing the deformation capacity of the total bead of glue (composed of the bead of glue 10 and of the second bead of glue 12) in order to avoid or to limit warping of the latter and manage the peripheral play between it and the body in white 6. For example, and in the case of a roof panel, the beads of adhesive are subjected to shear stresses in the longitudinal X and transverse Y directions, which they are able to withstand due to their flexibility.

In addition, and owing to a stack of two beads of glue 10 and 12, it is possible to attach the body panel 4 on deeper attachment points of the body structure 6 and thus to adjust the distance between these two elements (for example in the vertical direction Z if the body panel 4 is a roof panel).

The bead of glue 10 may comprise a core 14 configured to soften the bead of glue. The latter accentuates the deformation capacity of the means for bonding the body panel 4 to the body in white 6.

It may for example be a hollow core 14. The absence of plastic material at the core of the bead of glue 10 allows the deformation capacity of the latter to be accentuated.

Alternatively, the core 14 of the bead of glue 10 can be formed by a more flexible material than the rest of the bead of glue 10, for example of less dense polyurethane, a foamed material or a wick of fibers. The presence of a more flexible material at the heart of the bead of glue 10 allows the latter to deform more significantly. In a non-limiting example, a more flexible material is a material with a lower stiffness (i.e., a lower k value).

Alternatively, it is possible for the material forming the core 14 of the bead of glue 10 to be formed by a more rigid material than the rest of the bead of glue 10. This makes it possible, as explained above, to divide the most flexible material (i.e. the rest of the bead of glue) into two segments separated by a more rigid material. Creating these two segments allows the deformation capacity of the bead of glue 10 to be increased. It also contributes, as explained above, to creating the wedge mentioned above. The core 14 nevertheless remains more flexible than the body panel. In a non-limiting example, a more rigid material is a material with a greater stiffness (i.e., a higher k value).

The presence of a core 14 that is hollow or that comprises a material different from that forming the rest of the bead of glue 10 can allow the latter to harden, for example by crosslinking, more quickly. The core 14 and the bead of glue 10 can be placed simultaneously by a system of concentric nozzles.

The bead of glue 10 can have a thickness greater than or equal to 5 millimeters, preferably between 5 and 20 millimeters. This thickness range guarantees optimum flexibility of the bead of glue 10. If the second bead of glue 12 complies with the same condition, an assembly is obtained with a thickness that may be greater than 10 millimeters (which is advantageous for modulating the spacing between the body structure 6 and the body panel 2) while being composed of two flexible beads of glue. This thickness could be combined with a width of the bead of glue 10, a Young's modulus and an elongation at break that are adequate to obtain the desired flexibility.

Preferably, the bead of glue 10 is placed on the periphery of the main body 4 (in all or part of its periphery). Indeed, this is the area where it is necessary to manage the differential thermal expansion between the body panel 2 and the body structure 6 (the differential expansion between the body panel 2 and the body structure 6 is maximum at the periphery of the body panel 2, in particular at the edge(s) located at the ends of the body panel 2 along its largest dimension). It may preferably be the periphery of a roof panel, a body in white comprising a spacing all around the roof panel allowing expansion of the latter. In this case, the combination of this space with the positioning of the bonding track 10 at the periphery of the roof panel ensures the possibility of expansion of the latter while avoiding buckling during this expansion. This positioning of the bead of glue 10 is not mandatory and can be guided by the desire to attach the body panel 2 to the body structure 6 in one or more specific areas other than the periphery of the body panel 2.

The bead of glue 10 can be deposited at certain specific locations, as shown in FIGS. 1 and 2 (positioning in two sections at the periphery of the main body 4) or form a closed loop (not shown). This loop can for example be made over the entire periphery of the main body 4. The advantage of making a closed loop lies in the fact that the latter can simultaneously form a seal preventing the water from infiltrating between the body panel 2 and the body structure 6, a fortiori if it is made on the periphery of the main body 4.

It is possible to deposit several beads of glue, at least one of which is positioned more in the center of the body panel 2 than the other(s) (which could be the closed loop or any other bead of glue), or even in the center of the body panel. Such an additional bead of glue can allow:

creation of a wedge for the reasons mentioned above, support of the body panel 2 in a direction perpendicular to the main direction in which it extends (for example to support it in the vertical direction Z if it is a roof panel) in order to avoid vibration/sound problems and in order to limit bulging of the body panel 2, while avoiding the establishment of too rigid a connection between the body panel 2 and the body structure 6 (the body panel 2 can be allowed to bulge slightly in order to better distribute its thermal expansion over its entire surface and to avoid concentrations of mechanical stress and resulting warping). As an example, a bead of glue more in the center of the body panel 2 may indicate that the bead of glue is at a shorter distance from the center of the body panel 2.

In any event, the positioning of the bead(s) of glue 10 is carried out in order to provide benefits not only in terms of supporting the thermal expansion of the body panel, but can also make it possible to provide benefits regarding the points listed above.

The bead of glue 10 is produced in the conventional manner using a polyurethane-based material. It may for example be a 1K PU or 2K PU mastic. The latter has the advantage, as we will see later, of polymerizing in the open air and at room temperature and of guaranteeing, in the case of a bead of glue 10 forming a closed loop, a tightness of the desired area.

Regarding the manufacturing method of the body panel 2, the first step of the latter lies in molding the main body 4. It may conventionally be injection molding in the case where the main body is made of a thermoplastic material.

Once the main body 4 is molded, which step is potentially followed by a step of painting or not, for example depending on a customer's requirements, the second step includes in depositing the bead of glue 10. The latter, for example including of 1K PU mastic, can be deposited in one or more locations on the surface of the main body 4, continuously or not, by a robot equipped with a dispensing nozzle whose outlet opening gives the dimensions of the bead of glue 10. It is also possible for the painting step to be carried out after deposit of the bead of glue 10.

Following the deposit of the bonding track 10, the body panel 2 is now finished and can be packaged for transport. The bonding track 10 can cool and harden, for example by crosslinking in the open air and at room temperature if the material that forms it allows such crosslinking. Otherwise, a crosslinking step, for example by locally heating the bonding track 10, is necessary. The crosslinking can also be finalized during transport or storage preceding its final implementation on the vehicle, i.e. as soon as the material has crosslinked enough to be handled without risk of damaging it: this saves time for the production cycle without having to wait for complete crosslinking.

When mounting the body panel 2 on the body structure 6, the second codon of glue 12 can be deposited on the bead of glue 10 (see FIGS. 2 and 5). To ensure good adhesion between the two beads of glue 10 and 12, it is preferable for the latter to be made from material having the same base, for example a polyurethane base. The second bead of glue could for example also be formed from 1K PU mastic (conventionally used for bonding windshields). This ensures chemical compatibility between the two beads of glue 10 and 12.

Once the second bead of glue 12 has been deposited, the body panel 2 can be attached to the body structure 6 by compressing the second bead of glue 12 against the latter.

The double thickness of the beads of glue induces more flexibility in lateral shearing at the overall bead formed by the two beads of glue 10 and 12 to allow greater movement between the body panel 2 and the body structure 6 during differential expansions, without the internal mechanical stresses exceeding the elastic threshold authorized by the plastic material of the body panel 2 (i.e. by preventing the body panel 2 from deforming beyond its elastic range and consequently undergoing a plastic deformation.

What is claimed is:

1. Body part of a motor vehicle, characterized in that it comprises:
    a main body made of a plastic material and sized to be bonded to a motor vehicle body structure, and
    at least one first bead of glue arranged to receive a second bead of glue, wherein the at least one first bead of glue is positioned on the main body for bonding, wherein all of the at least one first bead of glue being made of a more flexible material than that forming the main body, wherein the at least one first bead of glue forms a closed loop of the more flexible material, characterized in that wherein all of the at least one first bead of glue comprises a core configured to soften the at least one first bead of glue, wherein the core is formed by a less dense material than the more flexible material of a rest of the at least one first bead of glue.

2. Body panel according to claim 1, wherein the core comprises a second more flexible material than that forming the rest of the at least one first bead of glue.

3. Body panel according to claim 1, wherein the core is a hollow core.

4. Body panel according to claim 1, wherein the at least one first bead of glue has a thickness greater than or equal to 5 millimeters.

5. Body panel according to claim 1, wherein the at least one first bead of glue is placed on a periphery of the main body.

6. Body panel according to claim 1, the body panel comprising several beads of glue, wherein at least one of the several beads of glue are positioned more in a center of the body panel than other beads of glue of the several beads of glue.

7. Body panel according to claim 1, wherein the at least one first bead of glue is a bead of polyurethane-based glue.

8. Body panel according to claim 1, wherein the body panel being a motor vehicle roof panel.

9. Body panel according to claim 1, wherein the at least one first bead of glue has a thickness between 5 millimeters and 20 millimeters.

10. Body panel according to claim 6, wherein the at least one of the several beads of glue is positioned in the center of the body panel.

* * * * *